United States Patent
Cheon et al.

(10) Patent No.: US 12,367,404 B2
(45) Date of Patent: Jul. 22, 2025

(54) ELECTRONIC DEVICE FOR SEARCHING ENCRYPTED DATA AND METHODS THEREOF

(71) Applicant: CRYPTO LAB INC., Seoul (KR)

(72) Inventors: Jung Hee Cheon, Seoul (KR); Hyeongmin Choe, Seoul (KR); Jai Hyun Park, Seoul (KR)

(73) Assignee: CRYPTO LAB INC., Seoul (KR)

( * ) Notice: Subject to any disclaimer, the term of this patent is extended or adjusted under 35 U.S.C. 154(b) by 0 days.

(21) Appl. No.: 18/423,541

(22) Filed: Jan. 26, 2024

(65) Prior Publication Data
US 2024/0354343 A1    Oct. 24, 2024

(30) Foreign Application Priority Data

Jan. 26, 2023  (KR) .................. 10-2023-0010320
Jan. 23, 2024  (KR) .................. 10-2024-0010378

(51) Int. Cl.
  *G06N 5/04*      (2023.01)
  *G06F 16/2453*   (2019.01)
  *G06F 16/901*    (2019.01)

(52) U.S. Cl.
  CPC .......... *G06N 5/04* (2013.01); *G06F 16/2453* (2019.01); *G06F 16/9017* (2019.01)

(58) Field of Classification Search
  CPC .... G06N 5/04; G06F 16/9017; G06F 16/2453
  See application file for complete search history.

(56) References Cited

U.S. PATENT DOCUMENTS

| | | | | |
|---|---|---|---|---|
| 2007/0169179 | A1* | 7/2007 | Narad | G06F 9/30127 712/3 |
| 2013/0173683 | A1* | 7/2013 | Carlough | G06F 7/5375 708/650 |
| 2016/0328207 | A1* | 11/2016 | Sexton | G06F 7/463 |
| 2018/0246915 | A1* | 8/2018 | Singh | G06F 16/221 |
| 2020/0410134 | A1* | 12/2020 | Bhowmick | G06F 21/6245 |

FOREIGN PATENT DOCUMENTS

CN  108170203 A * 6/2018 ............... G06F 1/03

OTHER PUBLICATIONS

Espancenet English language translation of Liu (Year: 2018).*

* cited by examiner

*Primary Examiner* — Apu M Mofiz
*Assistant Examiner* — Farhad Agharahimi
(74) *Attorney, Agent, or Firm* — Steinfl + Bruno LLP

(57) ABSTRACT

Disclosed is an electronic device including: a memory storing a lookup table including identification information and data matched to the identification information; an interface; and a processor configured to search the data matched to the identification information corresponding to search information by generating a position identification vector including the number of elements corresponding to the number of the lookup table, and repeatedly performing an operation of updating the position identification vector based on a comparison calculation result based on the search information and each segmented table part while segmenting the lookup table into a plurality of parts, in case of receiving the search information through the interface. Accordingly, the device may perform effective data search on the table including a homomorphically encrypted message.

4 Claims, 7 Drawing Sheets

FIG. 4

$$\vec{B}_0 = \begin{array}{|c|c|c|c|c|c|c|c|} \hline u_1 & u_2 & u_3 & u_4 & u_5 & u_6 & u_7 & u_8 \\ \hline \end{array}$$

$\vec{B}_0 = ( \quad B_{0,1} = 1 \quad )$ $\downarrow \beta = \text{comp}(2qr, B_{0,1}(u_4+u_5))$ $\times(1-\beta) \swarrow \quad \searrow \times \beta$ $\vec{B}_1 = ( \quad B_{1,1} \quad , \quad B_{1,2} \quad )$ $\downarrow \beta = \text{comp}(2qr, B_{1,1}(u_2+u_3) + B_{1,2}(u_6+u_7))$ $\times(1-\beta) \swarrow \searrow \times \beta \quad \times(1-\beta) \swarrow \searrow \times \beta$ $\vec{B}_2 = ( \quad B_{2,1} \quad , \quad B_{2,2} \quad , \quad B_{2,3} \quad , \quad B_{2,4} \quad )$ $\downarrow \beta = \text{comp}(2qr, B_{2,1}(u_1+u_2) + \ldots + B_{2,4}(u_7+u_8))$ $\times(1-\beta) \swarrow \searrow \times \beta \quad \ldots \quad \times(1-\beta) \swarrow \searrow \times \beta$ $\vec{B}_3 = ( B_{3,1}, B_{3,2}, \quad \ldots \quad , B_{3,8} ) \longrightarrow \langle \vec{B}_3, \vec{v} \rangle$

ELECTRONIC DEVICE FOR SEARCHING ENCRYPTED DATA AND METHODS THEREOF

BACKGROUND OF THE INVENTION

Field of the Invention

The present disclosure relates to an electronic device for searching encrypted data and a method thereof.

Description of the Prior Art

In accordance with the development of communication technology and a growing spread of electronic devices, efforts are continuously being made to maintain communication security between the electronic devices. Accordingly, encryption/decryption technology is used in most communication environments.

In case that a message encrypted by the encryption technology is delivered to the other party, the other party may be required to perform decryption to use the message. In this case, the other party may waste resources and time in a process of decrypting the encrypted data. In addition, the message may be easily leaked to a third party in case that the data temporarily decrypted by the other party for calculation is hacked by the third party.

A homomorphic encryption method is being studied to solve this problem. The homomorphic encryption method may acquire the same result as an encrypted value after performing the calculation on a plaintext even if the calculation is performed on an encrypted message itself without decrypting the encrypted data. Therefore, various calculations may be performed without decrypting the encrypted message.

An electronic device storing the encrypted data that is encrypted using the homomorphic encryption method may be required to search data. If the encrypted data and identification information to identify the same are matched to each other as a pair and stored in the form of a lookup table, the electronic device may be required to search the lookup table for the encrypted data corresponding to input identification information. However, binary searching appropriate data from the lookup table including the encrypted data that is encrypted using the homomorphic encryption method may require a significant calculation burden.

SUMMARY OF THE INVENTION

The present disclosure provides an electronic device with a reduced calculation burden for encrypted data search.

According to an embodiment of the present disclosure, provided is an electronic device including: a memory storing a lookup table including identification information and data matched to the identification information; an interface; and a processor configured to search the data matched to the identification information corresponding to search information by generating a position identification vector including the number of elements corresponding to the number of the lookup table, and repeatedly performing an operation of updating the position identification vector based on a comparison calculation result based on the search information and each segmented table part while segmenting the lookup table into a plurality of parts, in case of receiving the search information through the interface.

The processor may be configured to set the position identification vector to an initial value, segment the lookup table into two parts based on a midpoint, perform a comparison calculation of comparing the search information with a calculation value acquired by calculating the position identification vector and two identification information corresponding to boundaries of the segmented parts of the lookup table, and update the position identification vector to correspond to the segmented lookup table by reflecting the comparison calculation result to position identification information corresponding to each segmented lookup table.

The processor may be configured to set the initial value of the position identification vector to 1 after converting the lookup table into a lookup table having a data row of power of 2, perform a calculation of acquiring an inner product value of the position identification vector and a vector including an average of the two identification information corresponding to the boundaries of the segmented parts of the lookup table, and perform the comparison calculation of comparing the search information multiplied by 2 with the inner product value.

The processor may be configured to convert the segmented parts of the lookup table into a reduced-sized lookup table by using the position identification vector updated at a corresponding segmentation operation in case of performing the segmentation operation a predetermined number of times, and search the data matched to the identification information corresponding to the search information by performing a reduction operation of reducing the converted lookup table at least once.

According to at least one embodiment of the present disclosure, provided is a method of an electronic device for searching data, the method including: receiving search information; and searching data matched to identification information corresponding to the search information by generating a position identification vector including the number of elements corresponding to the number of the lookup table including the identification information and the data matched to the identification information, and repeatedly performing an operation of updating the position identification vector based on a comparison calculation result based on the search information and each segmented table part while segmenting the lookup table into a plurality of parts.

The searching of the data may include setting the position identification vector to an initial value; segmenting the lookup table into two parts based on a midpoint; performing a comparison calculation of comparing the search information with a calculation value acquired by calculating the position identification vector and two identification information corresponding to boundaries of the segmented parts of the lookup table; and updating the position identification vector to correspond to the segmented lookup table by reflecting the comparison calculation result to position identification information corresponding to each segmented lookup table.

In the setting of the position identification vector to the initial value, the initial value of the position identification vector may be set to 1 after the lookup table is converted into a lookup table having a data row of power of 2, and the performing of the comparison calculation may include performing a calculation of acquiring an inner product value of the position identification vector and a vector including an average of the two identification information corresponding to the boundaries of the segmented parts of the lookup table, and performing the comparison calculation of comparing the search information multiplied by 2 with the inner product value.

In the searching of the data, the segmented parts of the lookup table may be converted into a reduced-sized lookup table by using the position identification vector updated at a corresponding operation in case of performing the segmentation operation a predetermined number of times, and the data matched to the identification information corresponding to the search information may be searched by performing a reduction operation of reducing the converted lookup table at least once.

Advantageous Effects

According to the various embodiments above, it is possible to efficiently search the data from the lookup table including the homomorphically encrypted data.

BRIEF DESCRIPTION OF THE DRAWINGS

FIG. 4 is a view for explaining a lookup table segmentation operation;

DESCRIPTION OF THE PREFERRED EMBODIMENT

Figure 1:
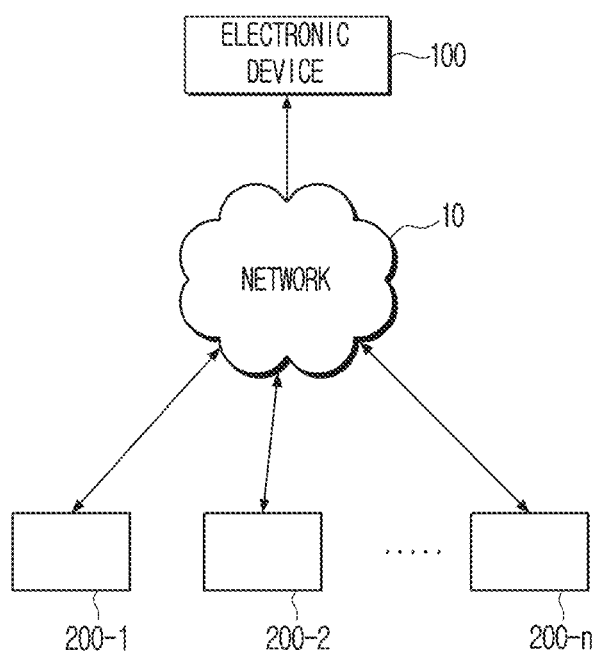
FIG. 1 is a view for explaining an operation of an electronic device according to an embodiment of the present disclosure.

Hereinafter, the present disclosure is described in detail with reference to the accompanying drawings. Encryption/decryption may be applied as necessary to a process of transmitting data (or information) that is performed in the present disclosure, and an expression describing the process of transmitting the data (or information) in the present disclosure and the claims should be interpreted as including cases of the encryption/decryption even if not separately mentioned. In the present disclosure, an expression such as "transmission/transfer from A to B" or "reception from A to B" may include transmission/transfer or reception while having another medium included in the middle, and may not necessarily express only the direct transmission/transfer or reception from A to B.

In describing the present disclosure, a sequence of each operation should be understood as non-restrictive unless a preceding operation in the sequence of each operation needs to logically and temporally precede a subsequent operation. That is, except for the above exceptional case, the essence of the present disclosure is not affected even though a process described as the subsequent operation is performed before a process described as the preceding operation, and the scope of the present disclosure should also be defined regardless of the sequence of the operations. In addition, in the specification, "A or B" may be defined to indicate not only selectively indicating either one of A and B, but also including both A and B. In addition, a term "including" in the present disclosure may have a meaning encompassing further including other components in addition to components listed as being included.

The present disclosure only describes essential components necessary for describing the present disclosure, and does not mention components unrelated to the essence of the present disclosure. In addition, it should not be interpreted as an exclusive meaning that the present disclosure includes only the mentioned components, but should be interpreted as a non-exclusive meaning that the present disclosure may include other components as well.

In addition, in the present disclosure, a "value" may be defined as a concept that includes a vector or a polynomial form as well as a scalar value.

Mathematical operations and calculations of each operation in the present disclosure described below may be implemented as computer operations by a known coding method or coding designed to be suitable for the present disclosure to perform the corresponding operations or calculations.

Specific equations described below are exemplarily described among possible alternatives, and the scope of the present disclosure should not be construed as being limited to the equations mentioned in the present disclosure.

For convenience of description, the present disclosure defines the following notations:

a←D: Select an element a according to distribution D.

s1, s2∈R: Each of S1 and S2 is an element belonging to a set R.

mod (q): Perform modular calculation with an element q.

$\lfloor \cdot \rceil$: Round an internal value.

Hereinafter, various embodiments of the present disclosure are described in detail with reference to the accompanying drawings.

FIG. 1 is a view for explaining an operation of an electronic device according to at least one embodiment of the present disclosure. Referring to FIG. 1, an electronic device 100 may be connected to a plurality of external devices 200-1 to 200-$n$ through a network 10.

For convenience of explanation, hereinafter, the devices 200-1 to 200-$n$ connected to the electronic device 100 are collectively referred to as the external devices. However, the devices 200-1 to 200-$n$ may respectively be implemented as various types of electronic devices each having a communication function.

The electronic device 100 may be implemented in any of various forms such as a server device, a personal computer (PC), a laptop PC, a mobile phone, a tablet PC, or a kiosk. In case of being implemented as the server device, the electronic device 100 may be implemented as any of various computing devices such as a workstation, a cloud, a data drive, or a data station.

The network 10 may include both of a wired network and a wireless network. The wired network may include a cable network or a telephone network, and the wireless network may include any network that transmits and receives a signal through a radio wave. The wired network and the wireless network may also be connected to each other.

Each of the external devices 200-1 to 200-$n$ may generate each encryption key. The encryption key may include a secret key and a public key. Each of the external devices 200-1 to 200-$n$ may encrypt various messages by using the generated encryption key, and transmit the encrypted message to the electronic device 100 through the network 10. In the present disclosure, the message may include various information or data to be transmitted, the encryption may be homomorphic encryption, and the encrypted message may be a homomorphically encrypted message.

Each of the external devices 200-1 to 200-$n$ may allow an error, that is encryption noise produced in a process of performing the homomorphic encryption to be included in the encrypted message. In detail, the homomorphically encrypted message generated by each of the external devices 200-1 to 200-*n* may be generated for a result value including the message and an error value to be restored in case that the encrypted message is later decrypted using the secret key.

As an example, the homomorphically encrypted message generated by each of the external devices 200-1 to 200-*n* may be generated to satisfy the following feature in case of being decrypted later using the secret key.

$$Dec(ct, sk) = \langle ct, sk \rangle = M + e(\bmod q) \quad \langle \text{Equation 1} \rangle$$

Here, < and > indicate dot product calculation (or usual inner product), ct indicates the encrypted message, sk indicates the secret key, M indicates a plaintext message, e indicates the encryption error value, and mod q indicates a modulus of the encrypted message. q needs to be chosen larger than the result value M multiplied by a scaling factor $\Delta$ to the message. In case that an absolute value of the error value e is sufficiently smaller than M, a decryption value M+e of the encrypted message may be a value that may replace an original message by the same precision in significant figure calculation. Among decrypted data, the error may be disposed on the least significant bit (LSB) side, and M may be disposed on the next least significant bit side.

In case that a size of the message is too small or too large, the size may be adjusted using the scaling factor. In case that the scaling factor is used, not only a message in an integer form but also a message in a real number form may be encrypted, and its usability may thus be greatly increased. In addition, the size of the message may be adjusted using the scaling factor to thus also adjust a size of an effective region, that is, a region where the messages exist in the encrypted message after the calculation is performed.

In some embodiments, the modulus q of the encrypted message may be set and used in various forms. As an example, the modulus of the encrypted message may be set in a form of an exponential power $q=\Delta^L$ of the scaling factor $\Delta$. In case that $\Delta$ is 2, the modulus may be set to a value such as $q=2^{10}$.

In addition, the homomorphically encrypted message according to the present disclosure is described assuming that a fixed point is used. However, the homomorphically encrypted message may also be applied even in case of using a floating point.

Each of the external devices 200-1 to 200-*n* may directly store the generated encrypted message or provide the same to the electronic device 100. Omitted is a description of a method for specifically generating the homomorphically encrypted message by each of the external devices 200-1 to 200-*n*.

The electronic device 100 may store various data transmitted from each of the external devices 200-1 to 200-*n* in the form of a lookup table. The lookup table may be a data set organized based on a series of rules. The lookup table may be alternatively referred to in various ways, such as a database, a data set, and a data source, and described as the lookup table in the present disclosure. The lookup table may include data rows including identification information and data matched to the identification information. The identification information may be an identifier or identification value to distinguish the data. The data may include various information. For example, each of the external devices 200-1 to 200-*n* in FIG. 1 may be the server device operated by a bank. In this case, each of the external devices 200-1 to 200-*n* may use a customer name or identification (ID) registered by a customer as the identification information, and match various data, such as each customer's personal information (address, photo, or the like), account number, balance information, and loan information, to the identification information. Each of the external devices 200-1 to 200-*n* may be required to provide the data to the electronic device 100. In this case, the external device may homomorphically encrypt the data to maintain security, and transmit the encrypted data. In this case, the external device may also encrypt the identification information, and transmit the identification information in a plaintext form.

In a state where the data provided from each of the external devices 200-1 to 200-*n* is stored in a lookup table format, the electronic device 100 may search data corresponding to the information in case of receiving information on the data to be searched. In the present disclosure, information to specify the data to be searched may be referred to as search information. The search information may be alternatively described in various ways, such as a search value and an observation value, and described as the search information in the present disclosure.

In case of receiving the search information, the electronic device 100 may search the data in various ways. Its details are described below.

Figure 2:
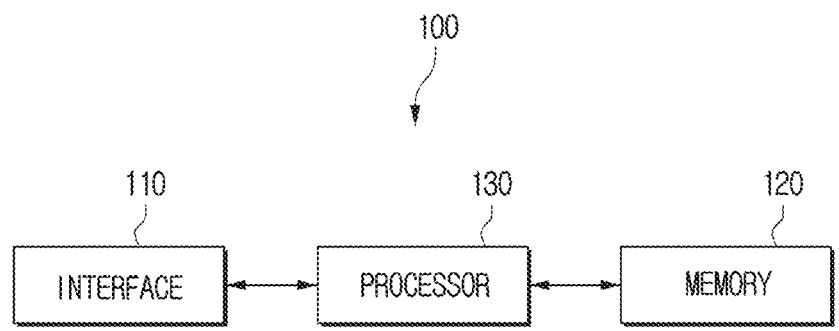
FIG. 2 is a block diagram showing a configuration of the electronic device according to at least one embodiment of the present disclosure.

FIG. 2 is a block diagram showing a configuration of the electronic device according to at least one embodiment of the present disclosure. Referring to FIG. 2, the electronic device 100 may include an interface 110, a memory 120, and a processor 130.

The interface 110 may be configured to provide interact between two or more systems, devices, programs, or users. The interface 110 may include at least one of a communication interface, an input/output interface, or a user interface.

The communication interface may be configured to perform communication with the external device through wired or wireless communication. According to FIG. 1, the communication interface may receive the encrypted data generated by the external devices 200-1 to 200-*n* and their identification information. In addition, the communication interface may receive the search information from a device that is to search the data. The communication interface may also be alternatively referred to as a communicator.

The input/output interface may be configured to transmit or receive various signals, data, or the like from a device connected thereto by wire. The input/output interface may include various ports such as a universal serial bus (USB) port and a high definition multimedia interface (HDMI) port for connecting various external devices such as a microphone, a keyboard, and a joystick thereto. The input/output interface may also be alternatively described as a connection port. The electronic device 100 may receive the above-mentioned encrypted data, the identification information, the search information, or the like from a memory device or the external device, connected thereto through the input/output interface.

The user interface may be configured to receive various user commands directly from the user. The user interface may be implemented as a touch screen, a touch pad, a button, or the like. For example, the user interface may be implemented as the touch screen. In this case, the user may input the search information directly in such a way that the user draws by touching the touch screen with the user's hand or a touch pen, or may also input a user query 10 through a soft keyboard displayed on the touch screen.

In the present disclosure, the user may input the identification information and data matched to the same or the search information for searching the data into the electronic device 100 through the various types of interface 110 described above.

The memory 120 may be configured to store various software, instructions, control codes, and data necessary for operating the electronic device 100. The memory 120 may be implemented as at least one of various memories such as a dynamic random access memory (DRAM), a static RAM (SRAM), a synchronous dynamic RAM (SDRAM), an one time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD).

The memory 120 may store the lookup table including the identification information and the data matched to the identification information.

The processor 130 may be configured to control an overall operation of the electronic device 100.

The processor 130 may include at least one of a digital signal processor (DSP), a micro processor, a central processing unit (CPU), a micro controller unit (MCU), a micro processing unit (MPU), a controller, an application processor (AP), or a communication processor (CP), an advanced reduced instruction set computer (RISC) machine (ARM) processor, or an artificial intelligence (AI) processor, and may be defined in this term. In addition, the processor 130 may be implemented in a system-on-chip (SoC) or a large scale integration (LSI), in which a processing algorithm is embedded, or may be implemented in the form of a field programmable gate array (FPGA). The processor 130 may perform various functions by executing computer executable instructions stored in the memory 120.

In case of receiving the search information through the interface 110, the processor 130 may perform the search in various ways.

Figure 3:
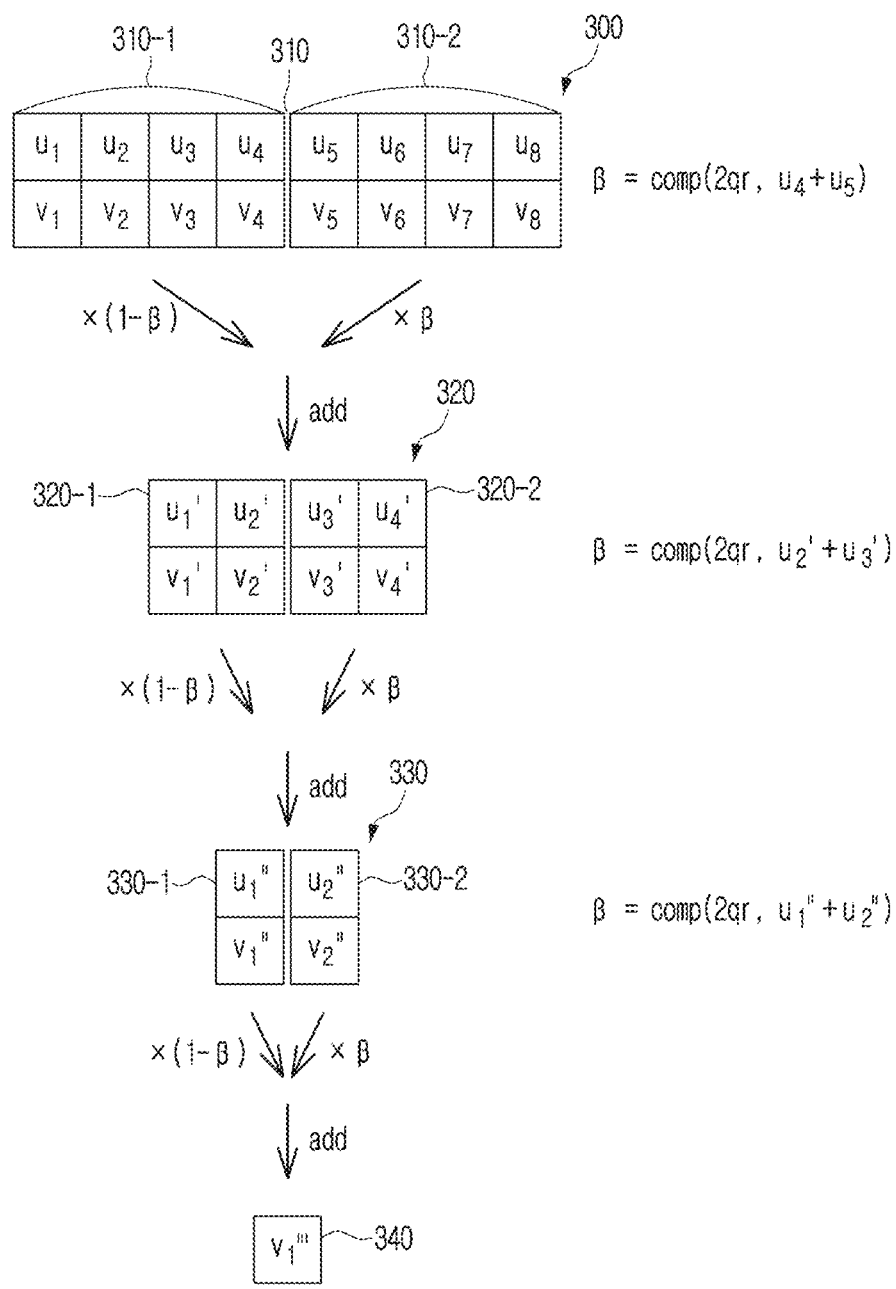
FIG. 3 is a view for explaining a lookup table reduction operation.

FIG. 3 is a view showing a method of searching the data by using a lookup table reduction operation according to one of the various embodiments of the present disclosure.

FIG. 3 shows one data row including identification information u1 to u8 and data v1 to v8 matched thereto and a lookup table 300 including a total of 8 data rows. The data row of the lookup table 300 may be power of 2 (2 to the power of 3 in FIG. 3). The processor 130 may reconstruct the lookup table 300 by adjusting the number of data rows, i.e., by adding a dummy data row or deleting some data rows if the number of data rows of the lookup table 300 is not the power of 2.

The processor 130 may reduce the lookup table by reflecting a comparison value comparing an average value of two identification information at the center of the lookup table with the search information and then combining the data rows in symmetrical positions of the table parts including the two identification information.

In an example of FIG. 3, the total of 8 data rows exist and a center 310 is a section between u4 and u5. The processor 130 may acquire the two identification information u4 and u5 disposed in the center. The processor 130 may calculate the search information multiplied by 2 and a u4+u5 value, respectively, and then perform a comparison calculation. The comparison calculation may be expressed as follows.

The search information may also be alternatively referred to as a user query or a query. The search information may be expressed as q. However, the search information is described as qr in the present disclosure to avoid confusion with the encrypted message modulus q described above.

$$\beta = comp(2qr, u4 + U5) \quad \text{(Equation 2)}$$

$\beta$ indicates a result value of a comparison calculation comp. $\beta$ may also be alternatively expressed as comp (qr, (u4+u5)/2). In case of performing comp(a, b), $\beta$ becomes zero if a<b, and $\beta$ becomes 1 if a>b.

The processor 130 may multiply a left part 310-1 of the lookup table by 1−$\beta$ and multiply a right part 310-2 of the lookup table by $\beta$, based on the center 310.

The processor 130 may acquire new identification information u' by adding calculation results of the identification information of the data rows at corresponding positions in the left and right parts 310-1 and 310-2 of the lookup table. The acquired identification information may be the identification information of the reduction lookup table.

For example, identification information u1' of a first data row in a reduction lookup table 320 may be expressed as follows.

$$u1' = u1(1 - \beta) + u5\beta \quad \text{(Equation 3)}$$

Referring to Equation 3, it may be seen that u1' of the reduction lookup table 320 is a value acquired by adding the calculation result of multiplying the first identification information u1 in the left part 310-1 of the lookup table by 1−$\beta$ and the calculation result of multiplying the first identification information u5 in the right part 310-2 of the lookup table by $\beta$.

In this way, the processor 130 may reduce the lookup table by combining the symmetrical data rows of the left and right parts 310-1 and 310-2 of the lookup table. Accordingly, the lookup table 300 originally including 8 data rows may be reduced to the lookup table 320 including 4 data rows. This operation may be referred to as a reduction operation in the present disclosure.

The processor 130 may repeatedly perform this reduction operation until a final data row is derived. Referring to FIG. 3, the processor 130 may again perform comparison value $\beta$=comp(2qr, u2'+u3') or comp(qr,(u2'+u3')/2) by using u2' and u3', which are boundaries of the lookup data rows on both sides based on the center of the first reduction lookup table 320.

The processor 130 may acquire a second reduction lookup table 330 by respectively multiplying the left part 320-1 and the right part 320-2 by 1−$\beta$ and $\beta$, and then combining the same.

Data rows of the second reduction lookup table 330 may have identification information of u1" and u2". The processor 130 may perform the reduction operation once again to acquire a third reduction lookup table 340. The third reduction lookup table 340 may include one data row. Accordingly, the processor 130 may identify data corresponding to the search information qr as data v1''' matched to identification information u1''' of the final lookup table 340.

The example of FIG. 3 shows the case where the left part is multiplied by 1−$\beta$ and the right part is multiplied by $\beta$, which is only an example, and may be alternatively set to multiply the left part by $\beta$ and multiply the right part by 1−$\beta$.

According to the embodiment of FIG. 3, the processor 130 may search the data by performing the comparison calculation a number of times corresponding to a value of a log $\log_2 T$ having a lookup table size. T indicates the number of data rows in the lookup table. In case of the lookup table with the size of $2^3=8$ as shown in FIG. 3, the processor 130 may search the data with only three comparison calculations.

For example, if the search information is a value corresponding to u3, u3 may be disposed in the left part 310-1 in the initial lookup table 300. Therefore, in case of performing the comparison calculation, the average of center values and qr may be compared with each other, qr may be smaller, and thus, β=zero.

Accordingly, the data rows u1 to u4 and v1 to v4 on the left part may be multiplied by 1−β=1, and the data rows on the right part may be multiplied by β=zero. Therefore, a third data row u3' of the first reduction lookup table 320 may be u3*1+u7*0=u3.

Next, in case of performing the comparison calculation again, qr may be greater than the average of the center values, and thus, β=1. Therefore, the identification information u1" of the first data row of the second reduction lookup table 330 may be u1*0+u3*1=u3. As a result, only u3 and v4 corresponding thereto may exist in the final reduction lookup table 340. According to this algorithm, the processor 130 may acquire v4, which is data corresponding to the search information qr (=u3).

The description describes hereinabove the method of searching the data according to the algorithm for reducing an overall size of the lookup table by merging its data rows with each other. However, according to this and another embodiment, the data may also be searched by segmenting the lookup table.

FIG. 4 is a view showing the method of searching the data by using a lookup table segmentation operation according to one of the various embodiments of the present disclosure. For convenience of explanation, referring to FIG. 4, the description is provided based on the lookup table including a total of 8 data rows as in FIG. 3. The processor 130 may generate a position identification vector including the number of elements corresponding to the number of the lookup table 300. In case of segmenting the lookup table 300, the position identification vector may be a vector used to identify a position of a part including the identification information corresponding to the search information among segmented parts of the lookup table. The position identification vector may be alternatively referred to as a position indication vector or a one-hot vector, and the lookup table that is segmented using the one-hot vector may also be referred to as a one-hot table.

The processor 130 may perform a segmentation operation of segmenting the lookup table 300 into a plurality of parts. For example, in case that the lookup table is initially segmented into two parts, the search information may be definitely included in one of the two parts, and may not be included in the other one.

The processor 130 may generate the position identification vector including the number of elements corresponding to the number of the lookup table 300. Only one lookup table 300 may initially exist, and an initial element of the position identification vector may be 1. The processor 130 may perform an operation of updating the position identification vector every time the table is segmented.

The processor 130 may first set the position identification vector to an initial value. Only one lookup table 300 may exist because the segmentation operation is yet to be performed, and the identification information corresponding to the search information qr may exist in one lookup table 300. Therefore, an initial value $B_{0,1}$ of the position identification vector may be set to 1.

The processor 130 may segment the lookup table into two parts based on the middle. FIG. 4 shows a state where the table is segmented into a first part of the lookup table including ui1 to u4 and a second part of the lookup table including u5 to u8. The processor 130 may perform the comparison calculation of comparing a calculation value acquired by multiplying the two identification information, that is, u4, u5 corresponding to boundaries between the first and second parts of the lookup table by the position identification vector $B_{0,1}$ with a calculation value of the search information qr multiplied by 2. In case of using (u4+u5)/2, which is the average value of u4 and u5, the comparison calculation may be performed by comparing (u4+u5)/2 with the search information qr as it is without multiplying the search information qr by 2.

The processor 130 may update the position identification vector by reflecting a comparison calculation result to position identification information corresponding to the first and second lookup tables segmented into two. The updated position identification vector may include two elements based on the number of segmented first and second lookup tables.

Referring to FIG. 4, the processor 130 may express the elements of the updated position identification vector $B_1$ as $B_{1,1}$ and $B_{1,2}$.

The processor 130 may calculate the first comparison value β=comp(2qr, B0,1(u4+u5)), then calculate $B_{1,1}$ by multiplying $B_{0,1}$ by 1−β, and calculates $B_{1,2}$ by multiplying $B_{0,1}$ by β.

The processor 130 may repeatedly perform the segmentation and updating operations until the processor 130 finally acquires the position identification vector including as many elements as entire data rows (for example, 8) of the lookup table 300.

That is, the processor 130 may perform a second segmentation operation to secure a total of 4 lookup tables and update the position identification vector based thereon to thus acquire a position identification vector $B_2$ including a total of 4 elements. Referring to FIG. 4, it may be seen that if the lookup table is segmented into four, the elements of the position identification vector $B_2$ are expressed as $B_{2,1}$, $B_{2,2}$, $B_{2,3}$, and $B_{2,4}$.

The processor 130 may then perform a third segmentation operation to secure a total of 8 lookup tables and update the position identification vector based thereon to thus acquire the position identification vector $B_2$ including a total of 4 elements.

If assuming that the search information is a search value corresponding to u3, only $B_{3,3}$, which is a third element of the final position identification vector, may have a value of 1, and all remaining elements may have a value of zero. Accordingly, the processor 130 may acquire data v3 corresponding to the search information qr with only three segmentation operations.

For convenience of explanation, the above embodiments describe a comparison result as zero or 1. However, if the data includes the homomorphically encrypted message described above, the comparison result may also be expressed in the form of the encrypted message.

As in a conventional case, general data may be stored in the memory 120 in the form of the lookup table. In this case, the processor 130 may search the identification information corresponding to the search information among the identification information in the lookup table by using a binary search method, and then search the data by extracting the data matched to the identification information. In this case, if T parts of identification information exist in the lookup table, the processor 130 may be required to perform a total of T comparison calculations.

In addition, the processor 130 is unable to perform the binary search if the data in the lookup table is the homomorphic encrypted data.

However, according to various embodiments of the present disclosure, the processor 130 may search the data by performing only minimal calculations even if the data is stored as the encrypted message.

Meanwhile, an embodiment described with reference to FIG. 3 and an embodiment described with reference to FIG. 4 may be used in combination with each other.

Figure 5:
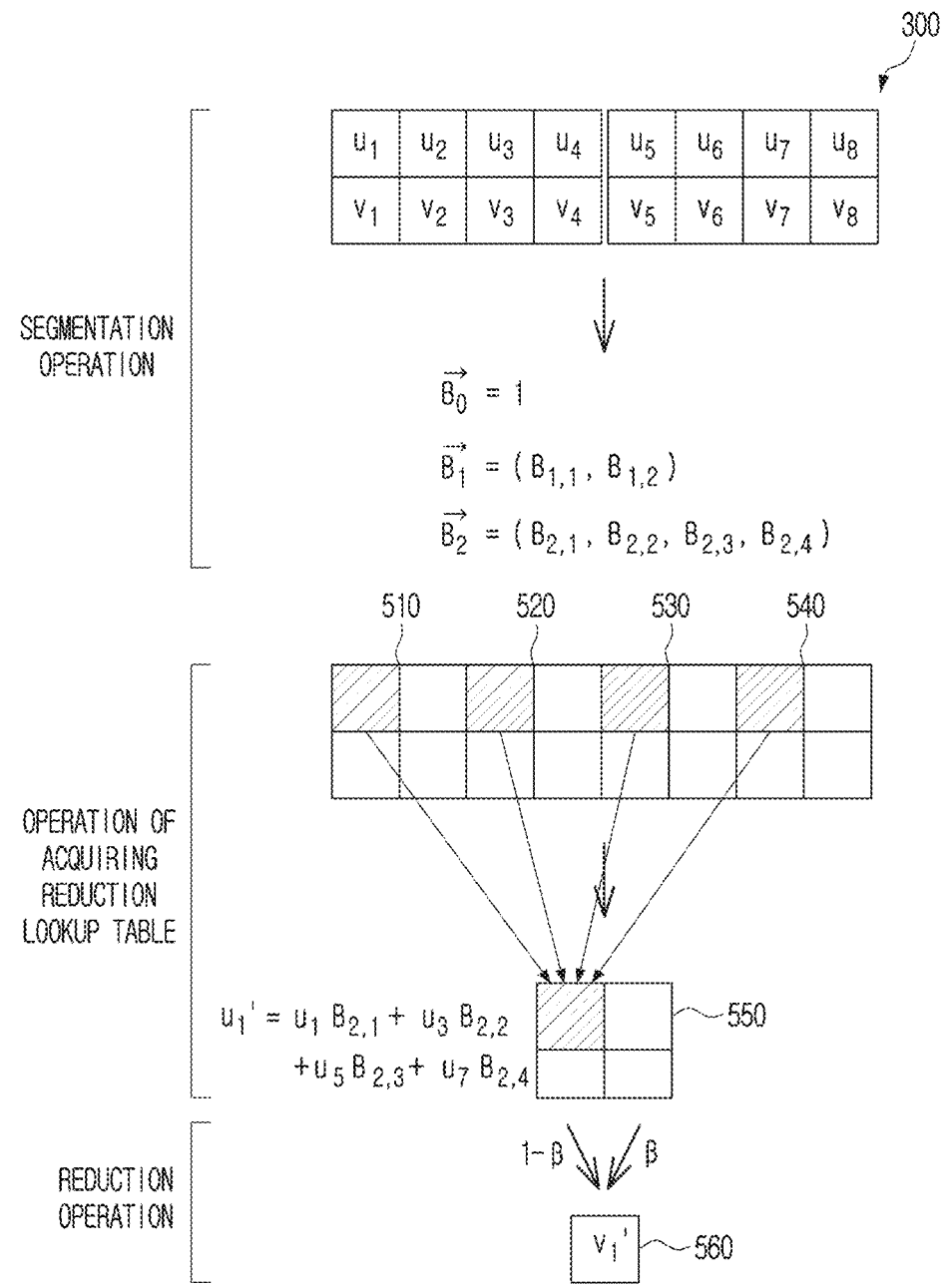
FIG. 5 is a view for explaining a search method using both the segmentation and reduction operations.

FIG. 5 is a view for explaining another embodiment of searching the data by using both the table segmentation and reduction operations.

The processor 130 may convert the segmented parts of the lookup table into the reduced-sized lookup table by performing the segmentation operation described with reference to FIG. 4 a predetermined number of times, and using the position identification vector updated at this segmentation operation. The processor 130 may search the data matched to the identification information corresponding to the search information by performing the reduction operation of reducing the converted lookup table at least once.

Referring to FIG. 5, the processor 130 may perform the segmentation operation twice as described with reference to FIG. 4 on the lookup table 300 including the total of 8 data rows to thus acquire the position identification vector $B_2$ having the total of 4 elements.

The processor 130 may perform an operation of acquiring the reduction lookup table by using the position identification vector $B_2$. In detail, the processor 130 may acquire a reduction lookup table 550 by reflecting the position identification vector $B_2$ to the identification information and the data of each data row at the corresponding position of lookup tables 510 to 540 segmented into four, and then adding the same.

Referring to FIG. 5, the first data row u1' of the reduction lookup table 550 may be $u1B_{2,1}+u3B_{2,2}+u5B_{2,3}+u7B_{2,4}$. The processor 130 may acquire a final lookup table 560 by performing the comparison calculation using u1' and u2' of the reduction lookup table 550, acquiring the comparison value $\beta$, reflecting $1-\beta$ and $\beta$ respectively thereto, and adding the same. The specific segmentation method and table reduction method are already described with reference to FIGS. 3 and 4 above, and their redundant descriptions are thus omitted.

The processor 130 may easily search data v1' corresponding to the search information qr from the final lookup table 560.

In the embodiment of FIG. 3, the calculation may be required to be performed not only on the identification information u but also on the data v. On the other hand, in the case of FIG. 4, the position identification vector may be updated based on the identification information, and in the initial operation, an embodiment of FIG. 4 may have an advantage over an embodiment of FIG. 3. On the contrary, after the lookup table is segmented to a certain number or more, it may be more advantageous to reduce the table according to the embodiment of FIG. 3 than to update the position identification vector. In this way, data search efficiency may be further increased by combining the embodiments of FIGS. 3 and 4 with each other.

Figure 6:
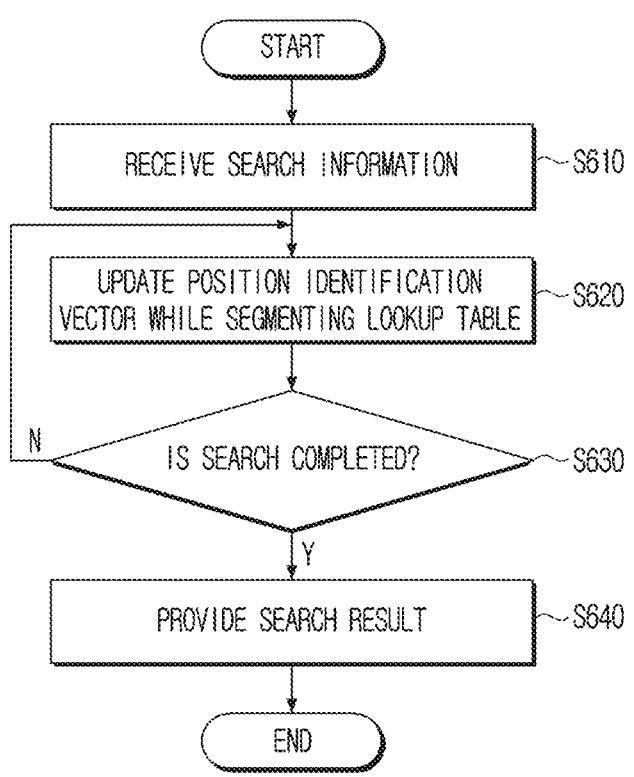
FIGS. 6 and 7 are flowcharts for explaining a data search method of an electronic device according to various embodiments of the present disclosure.
Figure 7:
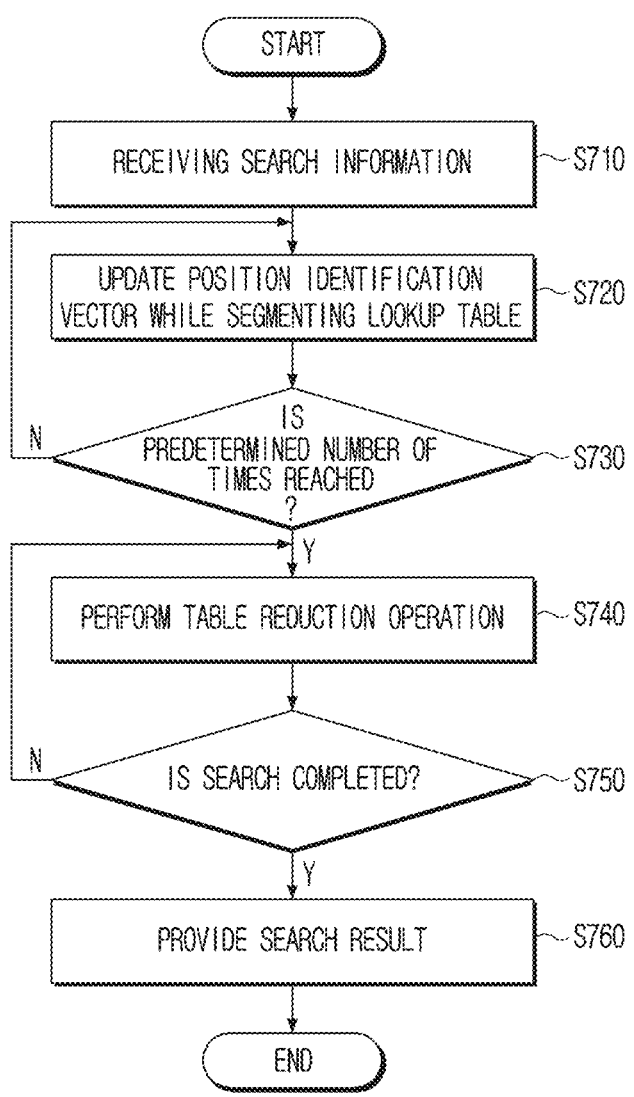

FIGS. 6 and 7 are flowcharts for explaining a data search method according to the various embodiments of the present disclosure.

Referring to FIG. 6, in case of receiving the search information (S610), the electronic device may update the position identification vector while segmenting the lookup table (S620). In detail, the electronic device may generate the position identification vector that includes the number of elements corresponding to the number of the lookup table including the identification information and the data matched thereto. The electronic device may segment the lookup table into the plurality of parts, and update the position identification vector based on the comparison calculation result based on each segmented table part and the search information.

The electronic device may repeatedly perform this operation until the search is completed (S630), search the data matched to the identification information corresponding to the search information, and provide the search result (S640).

The electronic device may provide the search result in various ways.

In detail, if the search information is transmitted from the external device, the electronic device may transmit the search result to the external device through communication. As an example, the electronic device may be the server device used by various national organizations. In this case, the identification information in the lookup table may be a citizen name, and data matched to this name may be a resident registration number, an address, or the like. In case that the name is input to the external electronic device used by the police to verify the identity, the electronic device may transmit the photo, address, resident registration number, or the like, corresponding to the name.

Alternatively, the electronic device may include a display. In this case, the electronic device may display a screen including the search result on the display. Alternatively, the electronic device may be connected to the external display device through the interface of the electronic device, the electronic device may transmit data to configure the screen including the search result to the external display device.

FIG. 6 is a flowchart corresponding to the operation of FIG. 4 described above. However, the electronic device may not necessarily need to search the data by using a method limited thereto, and may search the data by reducing the table based on the embodiment of FIG. 3. Its detailed flow diagram is omitted.

In addition, as described above, the embodiments of FIGS. 3 and 4 may be implemented in combination with each other.

FIG. 7 is a flowchart for explaining the data search method combining these embodiments with each other. Referring to FIG. 7, in case of receiving the search information (S710), the electronic device may update the position identification vector while segmenting the lookup table (S720). The electronic device may perform the segmentation and updating operations up to a predetermined number of times (S730), and then perform a table reduction operation in case that the predetermined number of times is reached (S740). The electronic device may perform the segmentation and updating operations until a size of the position identification vector becomes a root T, is not necessarily perform the operation limited thereto, and set the number of table reduction operations and the number of segmentation and updating operations variously for each embodiment.

The electronic device may perform the data reduction operation until one data row remains, and in case of completing the search (S750), the electronic device may provide the search result (S760).

A detailed description of the data search method in FIG. 7 is already made in the description provided with reference to FIG. 5, and its redundant description is thus omitted.

FIGS. 5 and 7 show that the electronic device first performs the segmentation and updating operations, and then performs the table reduction operation, is not necessarily limited thereto, and may be implemented to first perform the table reduction operation and then perform the segmentation and updating operations.

In addition, the data search method described with reference to FIGS. 6 and 7 may be performed by the electronic device having the configuration of FIG. 2, is not necessarily limited thereto, and may be performed by the electronic devices of various configurations.

In addition, in the various embodiments described above, at least one of the data stored in the lookup table, the identification information, or the search information may be used in the form of the homomorphic encrypted message. For example, the identification information and the data ui and vi in the lookup table may all be encrypted. In this case, if a value corresponding to the encrypted search information is searched, the result value may also be output in an encrypted state. Even if only the lookup table or only the search information is encrypted, the result value may be output in the encrypted state.

However, the various embodiments described above are not only applied to the encrypted message, but are also applied to general data. In addition, only a part of the identification information or only a part of the data in the lookup table may be encrypted.

Although the various embodiments have been individually described hereinabove, each embodiment is not necessarily implemented individually, and may also be entirely or partially combined with at least one other embodiment and implemented together in one product.

The various embodiments of the present disclosure may be implemented by software including an instruction stored in a machine-readable storage medium (for example, a computer readable storage medium).

In detail, provided is a non-transitory readable storage medium storing software for sequentially performing operations of searching data matched to the identification information corresponding to the search information by receiving the search information, generating the position identification vector including the number of elements corresponding to the number of the lookup table including the identification information and the data matched to the identification information, and repeatedly performing the operation of updating the position identification vector based on the comparison calculation result based on the search information and each segmented table part while segmenting the lookup table into the plurality of parts.

A device equipped with such a non-transitory readable medium may perform the operations such as the table reduction, the segmentation, the vector updating, and the data search described in the various embodiments described above.

Here, the term "non-transitory" in the non-transitory readable storage medium may only indicate that the storage medium is tangible without including a signal, and does not distinguish whether the data are semi-permanently or temporarily stored in the storage medium.

Alternatively, a program for performing the method according to the various embodiments described above may be distributed online through an application store. In case of the online distribution, at least a part of the computer program product may be at least temporarily stored or temporarily provided in a storage medium such as a memory of a server of a manufacturer, a server of an application store or a relay server.

In addition, each component (e.g., module or program) in the various embodiments may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although the present disclosure has been described with reference to the accompanying drawings, the scope of the present disclosure is determined by the claims described below and should not be construed as being limited to the above-described embodiments or drawings. In addition, it should be clearly understood that improvements, changes, and modifications obvious to those skilled in the art of the present disclosure described in the claims are also included in the scope of the present disclosure.

What is claimed is:

1. An electronic device comprising:
a memory storing a lookup table including identification information and data matched to the identification information;
an interface; and
a processor configured to:
based on receiving the search information through the interface, search the data matched to the identification information corresponding to search information by generating a position identification vector including the number of elements corresponding to the number of the lookup table, and repeatedly performing an operation of updating the position identification vector based on a comparison calculation result based on the search information and each segmented table part while segmenting the lookup table into a plurality of parts,
set the position identification vector to an initial value,
segment the lookup table into two parts based on a midpoint,
perform a comparison calculation of comparing the search information with a calculation value acquired by calculating the position identification vector and two identification information corresponding to boundaries of the segmented parts of the lookup table, and
update the position identification vector to correspond to the segmented lookup table by reflecting the comparison calculation result to position identification information corresponding to each segmented lookup table,
set the initial value of the position identification vector to 1 after converting the lookup table into a lookup table having a data row of power of 2,
perform a calculation of acquiring an inner product value of the position identification vector and a vector including an average of the two identification information corresponding to the boundaries of the segmented parts of the lookup table, and perform the comparison calculation of comparing the search information multiplied by 2 with the inner product value.

2. An electronic device comprising:

a memory storing a lookup table including identification information and data matched to the identification information;

an interface; and a processor configured to:

based on receiving the search information through the interface, search the data matched to the identification information corresponding to search information by generating a position identification vector including the number of elements corresponding to the number of the lookup table, and repeatedly performing an operation of updating the position identification vector based on a comparison calculation result based on the search information and each segmented table part while segmenting the lookup table into a plurality of parts, wherein the processor is configured to:

convert the segmented parts of the lookup table into a reduced-sized lookup table by using the position identification vector updated at a corresponding segmentation operation in case of performing the segmentation operation a predetermined number of times, and search the data matched to the identification information corresponding to the search information by performing a reduction operation of reducing the converted lookup table at least once.

3. A method of an electronic device for searching data, the method comprising:

receiving search information; and searching data matched to identification information corresponding to the search information by generating a position identification vector including the number of elements corresponding to the number of the lookup table including the identification information and the data matched to the identification information, and repeatedly performing an operation of updating the position identification vector based on a comparison calculation result based on the search information and each segmented table part while segmenting the lookup table into a plurality of parts, wherein the searching of the data includes:

setting the position identification vector to an initial value of 1 after the lookup table is converted into a lookup table having a data row of power of 2;

segmenting the lookup table into two parts based on a midpoint;

performing a comparison calculation of comparing the search information with a calculation value acquired by calculating the position identification vector and two identification information corresponding to boundaries of the segmented parts of the lookup table and performing a calculation of acquiring an inner product value of the position identification vector and a vector including an average of the two identification information corresponding to the boundaries of the segmented parts of the lookup table and comparing the search information multiplied by 2 with the inner product value; and updating the position identification vector to correspond to the segmented lookup table by reflecting the comparison calculation result to position identification information corresponding to each segmented lookup table.

4. A method of an electronic device for searching data, the method comprising:

receiving search information; and searching data matched to identification information corresponding to the search information by generating a position identification vector including the number of elements corresponding to the number of the lookup table including the identification information and the data matched to the identification information, and repeatedly performing an operation of updating the position identification vector based on a comparison calculation result based on the search information and each segmented table part while segmenting the lookup table into a plurality of parts;

wherein the searching of the data further comprises converting the segmented parts of the lookup table into a reduced-sized lookup table by using the position identification vector updated at a corresponding segmentation operation in case of performing the segmentation operation a predetermined number of times, and searching the data matched to the identification information corresponding to the search information by performing a reduction operation of reducing the converted lookup table at least once.

* * * * *